UNITED STATES PATENT OFFICE.

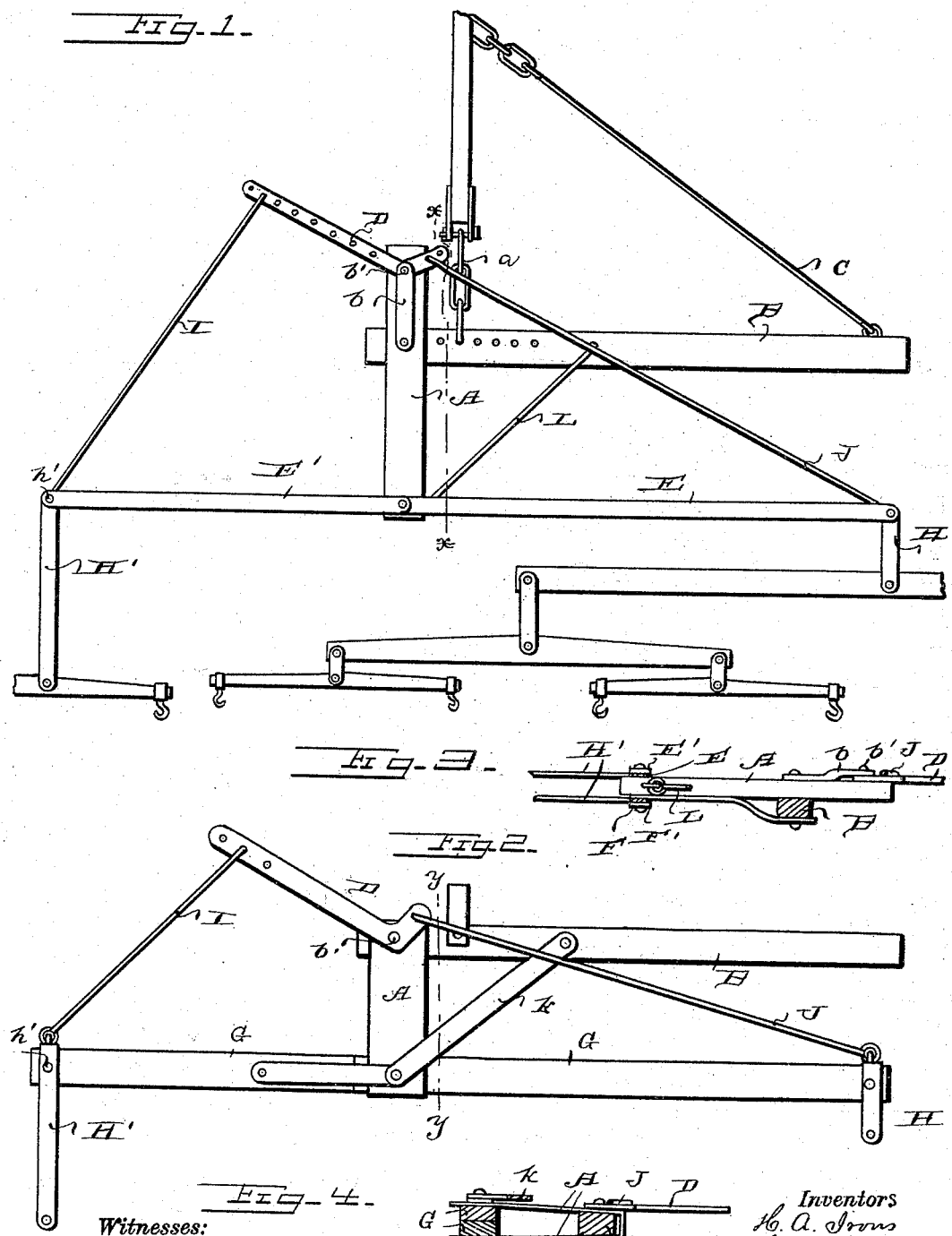

HENRY AUGUSTUS IRONS AND HERBERT PEEVEY HILL, OF GREELEY, COLORADO.

DRAFT-EQUALIZER.

SPECIFICATION forming part of Letters Patent No. 492,294, dated February 21, 1893.

Application filed August 29, 1892. Serial No. 444,422. (No model.)

*To all whom it may concern:*

Be it known that we, HENRY AUGUSTUS IRONS and HERBERT PEEVEY HILL, citizens of the United States, and residents of Greeley, in the county of Weld and State of Colorado, have invented certain new and useful Improvements in Draft-Equalizers; and we do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a plan view of the invention. Fig. 2 is a plan view showing modification. Fig. 3 is a section on line $x\ x$ Fig. 1, and Fig 4 is a section on line $y\ y$ Fig. 2.

This invention has relation to draft equalizers, designed for use with teams of four or more horses, and it consists in the novel construction and combination of parts, all as hereinafter specified.

Referring to the accompanying drawings, the letter A designates the main support block for the equalizer. This block may be of wood, as shown in Fig. 1, or of metal plates, as shown in Fig. 2.

B is the side draft bar, affixed at one end to the block A, and connected at its outer end, by the side draft rod or chain C, with the plow, or other device to which the equalizer is attached. Said side draft bar is also connected to the plow or other device by a clevis or hammer strap $a$.

D designates an angular L-shaped evener, which is pivoted at its angle to the rear portion of block A, by the hammer strap $b$ and bolt $b'$.

E, E', and F, F', are the lateral truss rods or bars, which are loosely secured to the block A at its outer end.

E, E' are the upper rods and F, F' the lower ones. In Fig. 2, I have however, shown these rods replaced by the single bars G, G.

To the end portions of the respective pairs E, F and E', F', of the truss rods, Fig. 1, and the truss bars, Fig. 2, are secured the forwardly projecting plates H, H', for the attachment of the eveners, double trees, and single trees, as illustrated.

I is a draft rod connected at one end to the longer arm of the angular evener D, and at its other end loosely connected with the truss rods E' and F', and plates H' by a bolt $h'$. J is a similar rod on the other side of the block A, and similarly connected to the short arm of the evener D, and the trusses E, F, and plates H.

L is a side draft rod connected at one end to the outer portion of the block A, and at the other end to the intermediate portion of the side draft bar B.

The various connections of the parts are made adjustable, as indicated in the drawings, in order that the draft may be regulated as desired, and the width of furrow regulated.

It will be apparent that single tree attachments may be provided so as to render the equalizers adapted for use with more than four horses.

In Fig. 2 as above referred to, are several slight modifications of the equalizer, the bars G, G, being substituted for the truss rods, double braces $k$, $k$, instead of the rod L, and the block A of metal plates instead of wood.

This device when attached to a plow, works one horse in the furrows, and the others on the un-plowed ground, abreast, and in a like manner when attached to other machinery.

Having described this invention, what we claim, and desire to secure by Letters Patent, is—

The herein described draft equalizer, comprising the main support block A, the side draft bar B connected at its inner end to said block A, the draft rod or chain connection between the outer portions of said bar B, and the plow or other device to which the equalizer is attached, said bar also having a draft connection with the plow or other device, the angular evener pivoted at its angle to the rear portion of said block A, the lateral truss rods or bars pivoted to the forward portion of said block A, the draft rods I and J connecting respectively the outer portions of said truss rods or bars with the arms of said evener, the side draft connection between the forward portion of the block A, and the side draft bar B, and the double tree and single tree attachments connected to said lateral truss rods or bars, substantially as specified.

In testimony whereof we affix our signatures in presence of two witnesses.

HENRY AUGUSTUS IRONS.
HERBERT PEEVEY HILL.

Witnesses:
ALBERT C. WILSON,
JOHN F. IRONS.